(12) United States Patent
Yeh et al.

(10) Patent No.: US 9,669,800 B2
(45) Date of Patent: Jun. 6, 2017

(54) CONTROL SYSTEM AND CONTROL METHOD FOR VEHICLE ANTI-THEFT

(71) Applicant: HON HAI PRECISION INDUSTRY CO., LTD., New Taipei (TW)

(72) Inventors: Chien-Yu Yeh, New Taipei (TW); Po-Hsien Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/842,233

(22) Filed: Sep. 1, 2015

(65) Prior Publication Data

US 2016/0078700 A1    Mar. 17, 2016

(30) Foreign Application Priority Data

Sep. 11, 2014    (TW) .............................. 103131448 A

(51) Int. Cl.
| G06F 7/04 | (2006.01) |
| B60R 25/00 | (2013.01) |
| G07C 9/00 | (2006.01) |
| B60R 25/24 | (2013.01) |

(52) U.S. Cl.
CPC ............ *B60R 25/00* (2013.01); *B60R 25/245* (2013.01); *G07C 9/00309* (2013.01); *G07C 2009/00793* (2013.01); *G07C 2209/63* (2013.01)

(58) Field of Classification Search
CPC .................... G07C 9/00309; G07C 2009/0038
USPC ......................................................... 340/5.61
See application file for complete search history.

(56) References Cited

U.S. PATENT DOCUMENTS

| 9,316,196 B2 * | 4/2016 | Nishimura .......... F02N 11/0807 |
| 2002/0130763 A1 * | 9/2002 | Aslanidis ................ B60R 25/24 340/5.61 |
| 2014/0285319 A1 * | 9/2014 | Khan .................. G07C 9/00309 340/5.61 |

* cited by examiner

*Primary Examiner* — Vernal Brown
(74) *Attorney, Agent, or Firm* — Steven Reiss

(57) ABSTRACT

A control method for vehicle anti-theft is provided. The control method includes: identifying whether a smart key matches with a vehicle when a trigger of the vehicle is activated; generating a vehicle location data when the smart key matches with the vehicle; receiving a smart key location data; calculating a distance between the smart key and the vehicle according to the vehicle location data and the smart key location data; determining whether the distance between the smart key and the vehicle is within a predefined distance; and unlocking the vehicle when the distance between the smart key and the vehicle is within the predefined distance.

20 Claims, 3 Drawing Sheets

CONTROL SYSTEM AND CONTROL METHOD FOR VEHICLE ANTI-THEFT

FIELD

The subject matter herein generally relates to control systems and control methods for vehicle anti-theft.

BACKGROUND

Passive Keyless Entry System (PKES) refers to a communication between a vehicle and a smart key according to the low-frequency signals and/or the high-frequency signals so as to achieve opening the door of the vehicle.

The effective propagation distance of the low-frequency signals can be 2-3 meters. Thus, the signals are only effective when the user is very close to the vehicle. The smart key can receive the low-frequency signals, such that a verification process can be started. However, the low-frequency signals can be multiplied by a third party, such that the low-frequency signals can be propagated a greater distance. Thus, the vehicle can be easily stolen.

BRIEF DESCRIPTION OF THE DRAWINGS

Implementations of the present technology will now be described, by way of example only, with reference to the attached figures.

DETAILED DESCRIPTION

Figure 1:
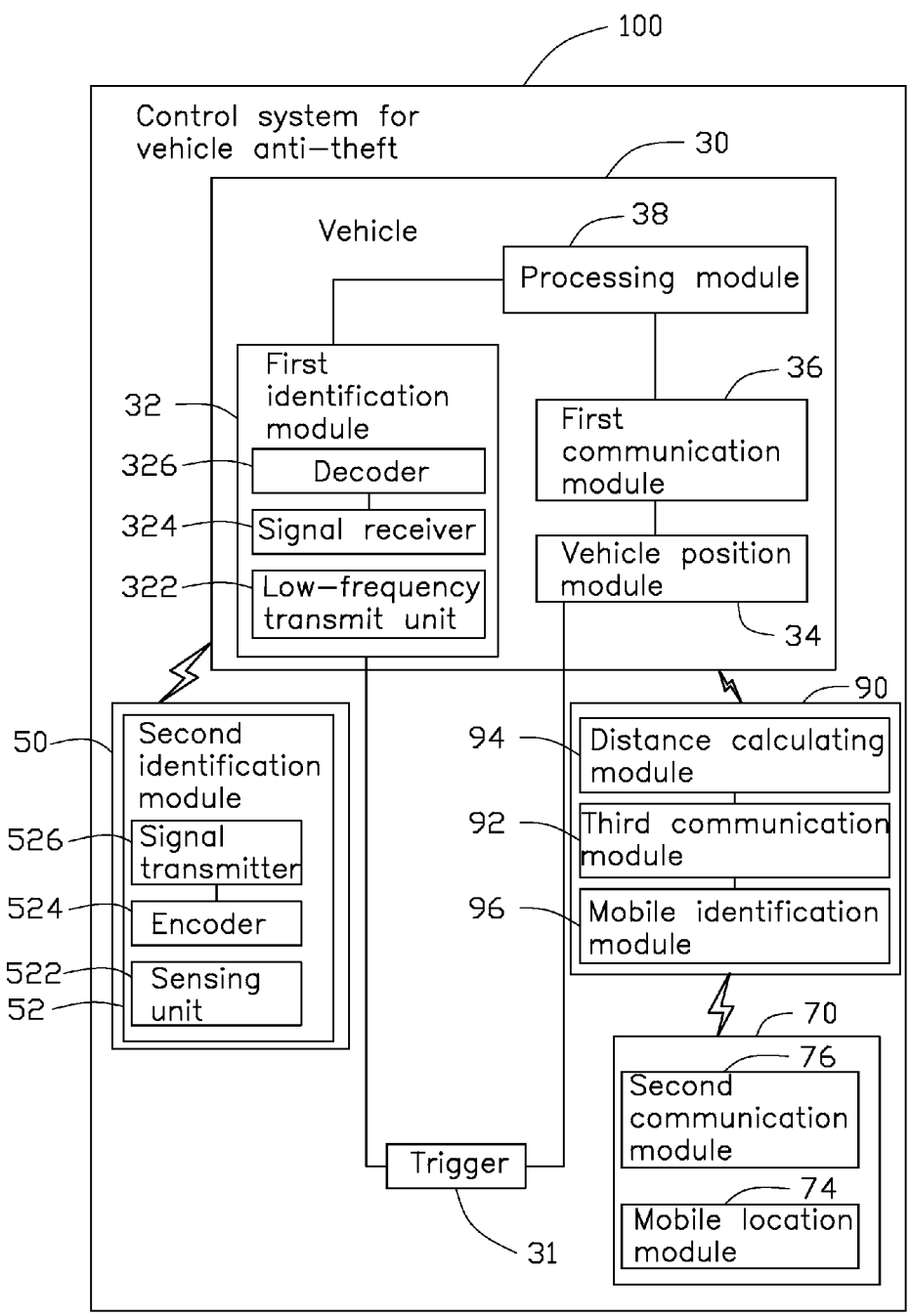
FIG. 1 a block diagram of an embodiment of a control system for vehicle anti-theft.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

A control system for vehicle anti-theft can include at least one processing unit and a non-transitory computer readable medium coupled to the at least one processing unit and configured to store instructions for execution by the at least one processing unit. The instruction can cause the at least one processing unit to identify whether a smart key matches with a vehicle when a trigger of the vehicle is activated. The instruction can cause the at least one processing unit to generate a vehicle location data when the smart key matches with the vehicle. The instruction can cause the at least one processing unit to receive a smart key location data. The instruction can cause the at least one processing unit to calculate a distance between the vehicle and the smart key according to the vehicle location data and the smart key location data. The instruction can cause the at least one processing unit to control the vehicle to unlock when the distance between the smart key and the vehicle is within a predetermined distance.

A control method for vehicle anti-theft can be provided. The control method can include: identifying whether a smart key matches with a vehicle when a trigger of the vehicle is activated; generating a vehicle location data when the smart key matches with the vehicle; receiving a smart key location data; calculating a distance between the smart key and the vehicle according to the vehicle location data and the smart key location data; determining whether the distance between the smart key and the vehicle is within a predefined distance; unlocking the vehicle when the distance between the smart key and the vehicle is within the predefined distance.

A non-transitory storage medium can have stored thereon instructions that, when executed by at least one processing unit of an electronic device, cause the at least one processing unit to execute instructions of a control method for vehicle anti-theft. The control method can include: identifying whether a smart key matches with a vehicle when a trigger of the vehicle is activated; generating a vehicle location data when the smart key matches with the vehicle; receiving a smart key location data; calculating a distance between the smart key and the vehicle according to the vehicle location data and the smart key location data; determining whether the distance between the smart key and the vehicle is within a predefined distance; unlocking the vehicle when the distance between the smart key and the vehicle is within the predefined distance.

FIG. 1 illustrates a control system 100 for vehicle anti-theft. The control system 100 can include a first identification module 32, a second identification module 52, a vehicle position module 34, a first communication module 36, a processing module 38, a mobile location module 74, a second communication module 76, a third communication module 92, and a distance calculating module 94.

In at least one embodiment, the control system 100 for vehicle anti-theft can include a vehicle 30, a smart key 50, a mobile phone 70, and a cloud server 90. The smart key 50, the mobile phone 70 and the cloud server 90 can respectively match with the vehicle 30 to use.

The vehicle 30 can be configured to wirelessly communicate with the smart key 50 to identify whether the smart key 30 matches with the vehicle 30. The vehicle 30 can include a trigger 31. Both the mobile phone 70 and the smart key 50 can move with an owner. The vehicle 30 can communicate with the mobile phone 70 via the cloud server 90. The first identification module 32, the vehicle position module 34, the first communication module 36, and the processing module 38 can be attached to any locations of the vehicle 30. The second identification module 52 can be attached to any locations of the smart key 50. The mobile location module 74 and the second communication module 76 can be attached to any locations of the mobile phone 70. The third communication module 92 and the distance calculating module 94 can be attached to any locations of the cloud server 90. In at least one embodiment, the control system for anti-theft can be applied on but not limited to the vehicle, the control system for anti-theft can be applied on any kinds of transportation means having the PKES, such as a ship, or an aircraft, or the like. In at least one embodiment, the trigger 31 can be a doorknob. In at least one embodiment, the trigger 31 can be a handle of a trunk, or a switch attached to the vehicle 30, or the like.

Referring to FIG. 1, the first identification module 32 can be electrically coupled to the trigger 31 and the processing module 38. The first identification module 32 can be configured to set up a wireless communication to the second identification module 52 when the trigger 31 is activated and further identify that the smart key 50 matches with the vehicle 30. In at least one embodiment, the first identification module 32 can include a low-frequency transmit unit 322, a signal receiver 324, and a decoder 326 electrically coupled to the signal receiver 324. The low-frequency transmit unit 322 can be electrically coupled to the trigger 31 and configured to transmit a low-frequency signal to the smart key 50 when the trigger 31 is activated, so that the smart key 50 can be activated to feedback an identification code to the first identification module 32. The signal receiver 324 can be configured to receive the identification code fed back from the smart key 50 and then transmit the identification code to the decoder 326. The signal receiver 324 can be an ultrahigh-frequency signal receiver. The decoder 326 can be electrically coupled to the processing module 38. The decoder 326 can be configured to decode the identification code to determine whether the smart key 50 matches with the vehicle 30 and feedback an identification result to the processing module 38.

In at least one embodiment, the second identification module 52 can include a sensing unit 522, an encoder 524, and a signal transmitter 526. The sensing unit 522 can be configured to detect the low-frequency signal transmitted from the vehicle 30 and then activate the smart key 50. The encoder 524 can be configured to generate the identification code when the smart key 50 is activated. The signal transmitter 526 can be an ultrahigh-frequency signal transmitter matching with the signal receiver 324 and configured to transmit the identification code generated by the encoder 524.

The vehicle position module 34 can be electrically coupled to the trigger 31 and the first communication module 36. The vehicle position module 34 can be configured to generate datum including a location of the vehicle 30 when the trigger 31 is activated. In at least one embodiment, the vehicle position module 34 can be a Global Position System (GPS) receiver. In at least one embodiment, the vehicle position module 34 can be any kinds of location positioning means, such as a Wi-Fi Positioning System (WPS) receiver, or the like. The first communication module 36 can be configured to communicate with the cloud server 90 via a long distance wireless network, such as a Global System for Mobile (GSM) or Wi-Fi, to transmit the location datum of the vehicle 30 to the cloud server 90.

The mobile location module 74 can be configured to generate location datum of the mobile phone 70. As the mobile phone 70 and the smart key 50 both move with the owner, the location datum of the mobile phone 70 generated from the mobile location module 74 can be the location datum of the second identification module 52 and/or the smart key 50. In at least one embodiment, the mobile location module 74 can be a Global Position System (GPS) receiver. In at least one embodiment, the mobile location module 74 can be any kinds of location positioning means, such as a Wi-Fi Positioning System (WPS) receiver, or the like. The second communication module 76 can be configured to communicate with the cloud server 90 according to a long distance wireless network, such as a Global System for Mobile (GSM) or Wi-Fi, to transmit the location datum of the mobile phone 70 to the cloud server 90. The mobile phone 70 can include some software to allow the mobile phone 70 to have a function of transmitting datum.

In at least one embodiment, the mobile phone 70 can be omitted, so long as the location datum of the smart key 50 can be generated, for example, the smart key 50 include a location module to generate the location datum of the smart key 50.

The cloud server 90 can be configured to receive the location datum transmitted from the mobile phone 70 and the vehicle 30 respectively. Furthermore, the cloud server 90 can calculate a distance between the location datum of the smart key 50 and the location datum of the vehicle 300 and feedback the distance datum to the vehicle 30. A third communication module 92 of the cloud server 90 can be configured to wirelessly communicate with the mobile phone 70 and the vehicle 30. The distance calculating module 94 can calculate the distance between the smart key 50 and the vehicle 30 according to the location datum of the smart key 50 and the vehicle 30 obtained by the third communication module 92. Furthermore, the distance calculating module 94 can feedback the distance datum to the vehicle 30.

The processing module 38 can be configured to receive the identification result fed back from the first identification module 32 and the distance datum transmitted from the first communication module 36. Furthermore, the processing module 38 can be used to determine whether the distance between the smart key 50 and the vehicle 30 is not more than a predefined distance between the smart key 50 and the vehicle 30. The processing module 38 can be further used to control the vehicle 30 to be unlocked according to the identification result and the distance datum. If the smart key 50 matches with the vehicle 30 and the distance between the smart key 50 and the vehicle 30 is not more than the predefined distance between the smart key 50 and the vehicle 30, the processing module 38 can determine the vehicle 30 should be unlocked and further control the vehicle 30 to be unlocked. If the smart key 50 matches with vehicle 30 but the distance between the smart key 50 and the vehicle 30 is more than the predefined distance between the smart key 50 and the vehicle 30, the processing module 38 can determine the vehicle 30 should not be unlocked.

Furthermore, the control system 100 for vehicle anti-theft can further include a mobile identification module 96 electrically coupled to the third communication module 92 and attached to any locations of the cloud server 90. The mobile identification module 96 can be used to determine a moving direction of the smart key 50 relative to the vehicle 30, according to the location datum of the smart key 50 and the location datum of the vehicle 30 obtained from the third communication module 92. Furthermore, the mobile identification module 96 can provides the moving direction datum to the processing module 38. The moving direction datum can be configured to illustrate the moving status of the smart key 50 relative to the vehicle 30. When the smart key 50 matches with the vehicle 30 and the distance between the smart key 50 and the vehicle 30 is within the predefined distance between the smart key 50 and the vehicle 30, the processing module 38 can further determine whether the vehicle is unlocked according to the moving direction datum of the smart key 50. If the distance between the smart key 50 and the vehicle 30 is within the predefined distance between the smart key 50 and the vehicle 30 when the smart key 50 matches with the vehicle 30 and the smart key 50 moves towards the vehicle, the processing module 38 can control the vehicle to be unlocked. If the distance between the smart key 50 and the vehicle 30 is within the predefined distance between the smart key 50 and the vehicle 30 when the smart key 50 matches with the vehicle 30 but the smart key 50 moves away from the vehicle, the vehicle cannot be unlocked.

The modules of the control system 100 can include separated functionalities represented by hardware or integrated circuits, or as software and hardware combinations, such as a special-purpose processor or a general-purpose processor with special-purpose firmware.

In at least one embodiment, the processing module 38 can be a central processing unit, a digital signal processor, or a single chip, for example.

Figure 2:
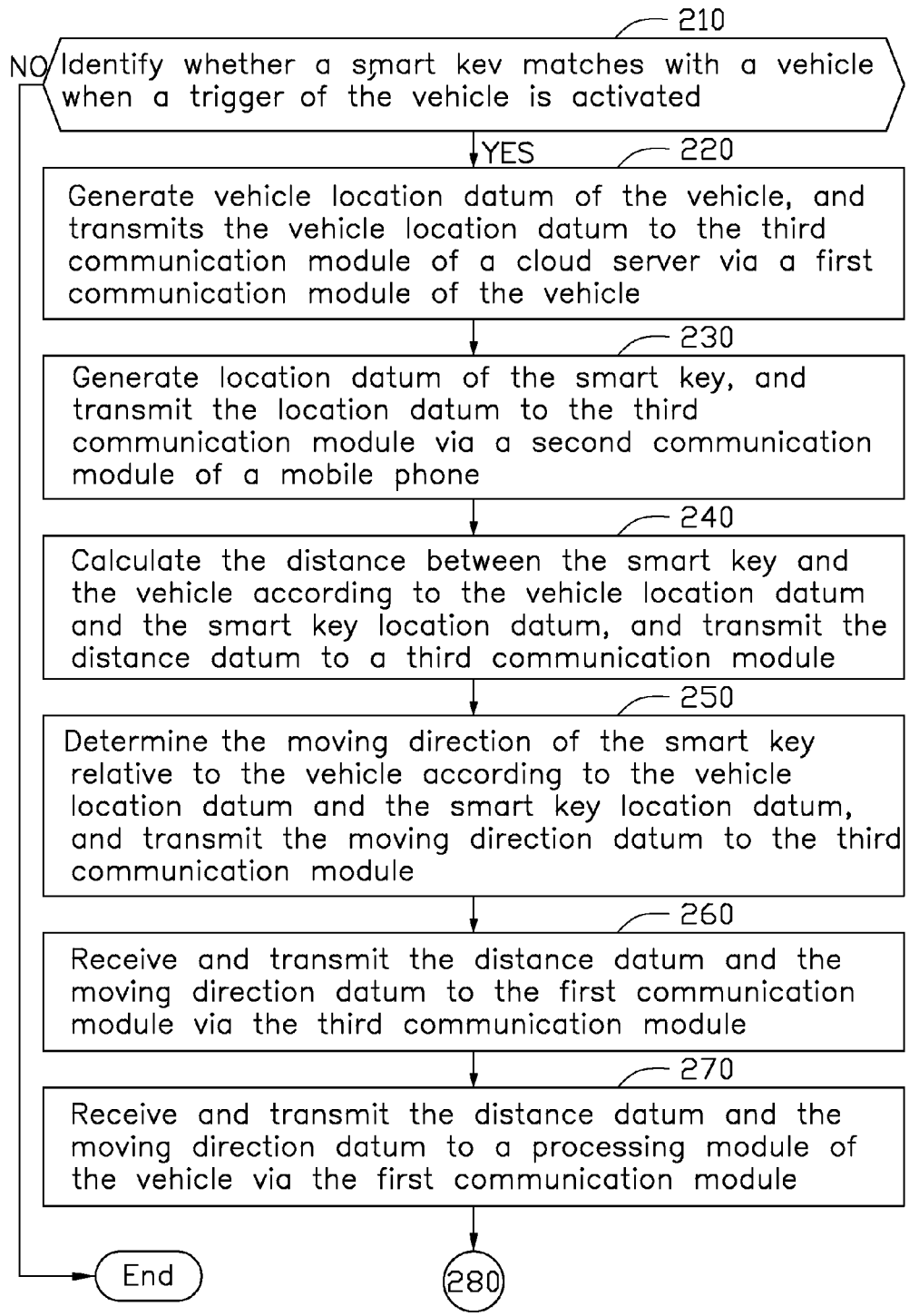
FIGS. 2 and 3 cooperatively constitute a signal flowchart of an embodiment of a control method for vehicle anti-theft
Figure 3:
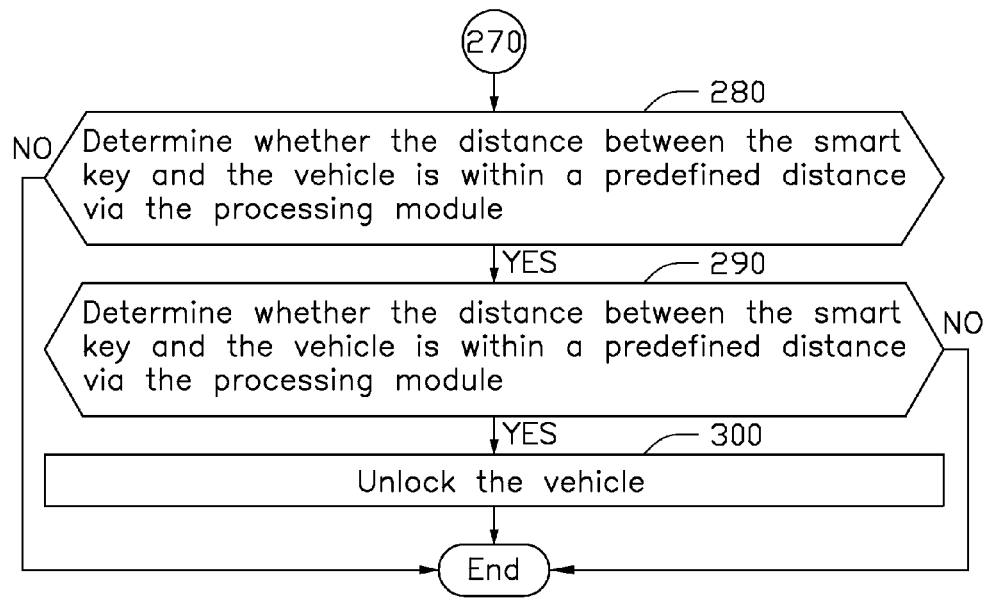

FIGS. 2 and 3 illustrate a signal flowchart of a control method for vehicle anti-theft. The control method is provided by way of example, as there are a variety of ways to carry out the method. The control method described below can be carried out using the configurations illustrated in FIG. 1, for example, and various elements of these figures are referenced in explaining the example method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 210.

At block 210, a first identification module of a vehicle wirelessly communicates with a smart key when a trigger of the vehicle is activated and identifies whether the smart key matches with the vehicle, if yes, the process goes to block 220, otherwise, the process goes to end. When the trigger is activated, a low-frequency transmit unit of the first identification module can transmit low-frequency signals, and the smart key can be activated when a sensing unit of the smart key detects the low-frequency signals and control an encoder of the smart key to transmit an identification code via a signal transmitter of the smart key. A signal receiver of the vehicle receives the identification code. A decoder of the vehicle decodes the identification code and identifies whether the smart key matches with the vehicle according to the identification code. The identification result is transmitted to the processing module.

At block 220, a vehicle position module generates vehicle location datum of the vehicle and transmits the vehicle location datum to a third communication module of a cloud server via a first communication module of the vehicle.

At block 230, a mobile location module of a mobile phone carried by an owner generates location datum of the smart key and transmits the location datum to the third communication module via a second communication module of the mobile phone.

At block 240, a distance calculating module calculates the distance between the smart key and the vehicle according to the vehicle location datum and the smart key location datum and transmits the distance datum to the third communication module.

At block 250, a mobile identification module calculates a moving direction of the smart key relative to the vehicle according to the vehicle location datum and the smart key location datum and transmits the moving direction datum to the third communication module.

At block 260, the third communication module receives and transmits the distance datum and the moving direction datum to the first communication module of the vehicle.

At block 270, the first communication module receives and transmits the distance datum and the moving direction datum to a processing module of the vehicle.

At block 280, the processing module determines whether the distance between the smart key and the vehicle is within a predefined distance, if yes, the process goes to block 280, otherwise, the process goes to end.

At block 290, the processing module determines whether the smart key moves towards the vehicle, if yes, the process goes to block 300, otherwise, the process goes to end.

At block 300, the vehicle is unlocked.

In at least one embodiment, the third communication module 92, the distance calculating module 94, and the mobile identification module 96 can be positioned in the smart key 50, the mobile phone 70, or the vehicle 30 as needed.

In at least one embodiment, the mobile location module 74 and the second communication module 76 can be positioned in the smart key 50.

In at least one embodiment, the second identification module 52 can be positioned in the mobile phone 70.

The embodiments shown and described above are only examples. Many details are often found in the art, such as features of control system and control method for vehicle anti-theft. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. Therefore, those of ordinary skill in the art can make various modifications to the embodiments without departing from the scope of the disclosure, as defined by the appended claims.

What is claimed is:

1. A control system for vehicle anti-theft comprising:
at least one processing unit; and
a non-transitory computer readable medium coupled to the at least one processing unit and having instructions stored thereon for execution by the at least one processing unit, the instructions causing the at least one processing unit to:
 identify whether a smart key matches to a vehicle when a trigger of the vehicle is activated;
 generate a vehicle location data, wherein the vehicle location data is generated by a Global Position System (GPS) receiver of the vehicle and transmitted to a cloud server, when the smart key matches to the vehicle;
 process a smart key location data, wherein the smart key location data is generated by a GPS receiver of a mobile phone together with the smart key or a GPS receiver of the smart key;
 transmit the smart key location data to the cloud server;
 calculate a distance between the vehicle and the smart key according to the vehicle location data and the smart key location data stored in the cloud server; and
 control the vehicle to unlock when the distance between the smart key and the vehicle is within a predefined distance.

2. The control system of claim 1, wherein the instructions cause the at least one processing unit to prevent the vehicle from being unlocked when the distance between the smart key and the vehicle is outside the predefined distance.

3. The control system of claim 1, wherein the instructions cause the at least one processing unit to determine a moving direction of the smart key according to the vehicle location data and the smart key location data, and wherein the instructions cause the at least one processing unit to unlock the vehicle when the distance between the smart key and the vehicle is within the predefined distance and the smart key moves closer towards the vehicle.

4. The control system of claim 3, wherein the instructions cause the at least one processing unit to prevent the vehicle from being unlocked when the distance between the smart key and the vehicle is outside the predefined distance, or the smart key does not move towards the vehicle.

5. The control system of claim 1, wherein the instructions cause the at least one processing unit to control a low-frequency transmit unit of the vehicle, the low-frequency transmit unit being electrically coupled to the trigger to transmit a low-frequency signal to make the smart key activated when the trigger is activated.

6. The control system of claim 5, wherein the instructions cause the at least one processing unit to control a sensing unit of the smart key to detect the low-frequency signal that activates the smart key.

7. The control system of claim 1, wherein the instructions cause the at least one processing unit to control a signal receiver of the vehicle to receive an identification code fed back from the smart key, and the instructions cause the at least one processing unit to control a decoder of the vehicle to decode the identification code to determine whether the smart key matches the vehicle.

8. The control system of claim 7, wherein the instructions cause the at least one processing unit to control an encoder of the smart key to generate the identification code, and the instructions cause the at least one processing unit to control a signal transmitter to transmit the identification code to the signal receiver to determine whether the smart key matches the vehicle.

9. A control method for vehicle anti-theft comprising:
identifying whether a smart key matches a vehicle when a trigger of the vehicle is activated;
generating a vehicle location data, wherein the vehicle location data is generated by a Global Position System (GPS) receiver of the vehicle and transmitted to a cloud server, when the smart key matches the vehicle;
processing a smart key location data, wherein the smart key location data is generated by a GPS receiver of a mobile phone together with the smart key or a GPS receiver of the smart key;
transmitting the smart key location data to the cloud server;
calculating a distance between the smart key and the vehicle according to the vehicle location data and the smart key location data stored in the cloud server;
determining whether the distance between the smart key and the vehicle is within a predefined distance; and
unlocking the vehicle when the distance between the smart key and the vehicle is within the predefined distance.

10. The control method of claim 9, the control method further comprising:
preventing the vehicle from being unlocked when the distance between the smart key and the vehicle is outside the predefined distance.

11. The control method of claim 9, the control method further comprising:
determining a moving direction of the smart key according to the vehicle location data and the smart key location data; and
unlocking the vehicle when the distance between the smart key and the vehicle is within the predefined distance, and the smart key moves closer towards the vehicle.

12. The control method of claim 11, the control method further comprising:
preventing the vehicle from being unlocked when the distance between the smart key and the vehicle is outside the predefined distance, or the smart key does not move towards the vehicle.

13. The control method of claim 9, control method further comprising:
controlling a low-frequency transmit unit of the vehicle to transmit a low-frequency signal to make the smart key activated when the trigger is activated.

14. The control method of claim 13, the control method further comprising:
detecting the low-frequency signal for making the smart key activated to active the smart key.

15. The control method of claim 9, the control method further comprising:
controlling a signal receiver of the vehicle to receive an identification code fed back from the smart key, and
controlling a decoder of the vehicle to decode the identification code to determine whether the smart key matches the vehicle.

16. The control method of claim 15, the control method further comprising:
controlling an encoder of the smart key to generate the identification code; and
controlling a signal transmitter of the smart key to transmit the identification code to the signal receiver to determine whether the smart key matches the vehicle.

17. A non-transitory storage medium having stored thereon instructions that, when executed by at least one processing unit of an electronic device, cause the at least one processing unit to execute instructions of a control method for vehicle anti-theft, the control method comprising:
identifying whether a smart key matches a vehicle when a trigger of the vehicle is activated;
generating a vehicle location data, wherein the vehicle location data is generated by a Global Position System (GPS) receiver of the vehicle and transmitted to a cloud server, when the smart key matches the vehicle;
processing a smart key location data, wherein the smart key location data is generated by a GPS receiver of a mobile phone together with the smart key or a GPS receiver of the smart key;
transmitting the smart key location data to the cloud server;
calculating a distance between the smart key and the vehicle according to the vehicle location data and the smart key location data stored in cloud server;
determining whether the distance between the smart key and the vehicle is within a predefined distance; and
unlocking the vehicle when the distance between the smart key and the vehicle is within the predefined distance.

18. The control method of claim 17, the control method further comprising:

prevent the vehicle from being unlocked when the distance between the smart key and the vehicle is outside the predefined distance.

19. The control method of claim 17, the control method further comprising:
   determining a moving direction of the smart key according to the vehicle location data and the smart key location data; and
   unlocking the vehicle when the distance between the smart key and the vehicle is within the predefined distance, and the smart key moves closer towards the vehicle.

20. The control method of claim 19, the control method further comprising:
   prevent the vehicle from being unlocked when the distance between the smart key and the vehicle is outside the predefined distance, or the smart key does not move towards the vehicle.

* * * * *